United States Patent
Bochenek et al.

(10) Patent No.: US 9,956,909 B2
(45) Date of Patent: May 1, 2018

(54) VECTOR-BASED DRIVER ASSISTANCE FOR TOWING VEHICLE

(71) Applicant: Robert Bosch GmbH, Stuttgart (DE)

(72) Inventors: Jeffrey Allen Bochenek, Milford, MI (US); Jonathan Charles Diedrich, Carleton, MI (US); Mark Gehrke, Ypsilanti, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/035,506

(22) PCT Filed: Nov. 18, 2014

(86) PCT No.: PCT/US2014/066096
§ 371 (c)(1),
(2) Date: May 10, 2016

(87) PCT Pub. No.: WO2015/074027
PCT Pub. Date: May 21, 2015

(65) Prior Publication Data
US 2016/0264046 A1    Sep. 15, 2016

Related U.S. Application Data

(60) Provisional application No. 61/905,677, filed on Nov. 18, 2013.

(51) Int. Cl.
*B60Q 9/00* (2006.01)
*B60D 1/30* (2006.01)
(Continued)

(52) U.S. Cl.
CPC ............... *B60Q 9/00* (2013.01); *B60D 1/30* (2013.01); *B60D 1/62* (2013.01); *B60T 8/1708* (2013.01);
(Continued)

(58) Field of Classification Search
CPC .... B60Q 9/00; B60D 1/30; B60D 1/62; B60T 8/1708; B60T 8/248; B60T 2230/06;
(Continued)

(56) References Cited

U.S. PATENT DOCUMENTS

| 5,558,350 A | 9/1996 | Kimbrough et al. |
| 2008/0231701 A1 | 9/2008 | Greenwood et al. |

(Continued)

FOREIGN PATENT DOCUMENTS

| CN | 101402363 A | 4/2009 |
| DE | 102011104256 A1 | 7/2012 |

(Continued)

OTHER PUBLICATIONS

Office Action with English translation from the Japanese Patent Office for Application No. 2016-532041 dated Jun. 5, 2017 (8 pages)

(Continued)

*Primary Examiner* — Jerrah Edwards
*Assistant Examiner* — Mathew Franklin Gordon
(74) *Attorney, Agent, or Firm* — Michael Best & Friedrich LLP

(57) ABSTRACT

Systems and methods are described for monitoring movement of a trailer relative to the towing vehicle and providing driver-assistance information to the driver of the towing vehicle. The system determines a velocity vector for the host vehicle at a location near a rear of the host vehicle at a defined lateral distance from a trailer hitch installed on the host vehicle. The system also determines a velocity vector for the trailer at a corresponding location on the trailer—that is a location on the front of the trailer at approximately the same defined lateral distance from the trailer hitch. The system compares the velocity vector for the host vehicle to the velocity vector for the trailer and determines, based on (Continued)

the comparison, whether a jack-knife condition is likely to occur. If a jack-knife condition is likely to occur, the system generates a warning signal.

13 Claims, 4 Drawing Sheets

(51) Int. Cl.
*B62D 13/00* (2006.01)
*B60D 1/62* (2006.01)
*B60T 8/17* (2006.01)
*B60T 8/24* (2006.01)
*B62D 13/06* (2006.01)
*B62D 15/02* (2006.01)
*B60W 40/105* (2012.01)
*B60R 1/00* (2006.01)

(52) U.S. Cl.
CPC ........... *B60T 8/248* (2013.01); *B60W 40/105* (2013.01); *B62D 13/00* (2013.01); *B62D 13/06* (2013.01); *B62D 15/027* (2013.01); *B60R 1/003* (2013.01); *B60T 2230/06* (2013.01); *B60W 2300/14* (2013.01); *B60W 2420/42* (2013.01); *B60W 2520/14* (2013.01)

(58) Field of Classification Search
CPC ........... B60W 40/105; B60W 2300/14; B60W 2520/14; B60W 2420/42; B62D 13/00; B62D 13/06; B62D 15/027; B60R 1/003
See application file for complete search history.

(56) References Cited

U.S. PATENT DOCUMENTS

| 2012/0185131 A1 | 7/2012 | Headley |
| 2013/0024064 A1 | 1/2013 | Shepard |
| 2013/0179038 A1 | 7/2013 | Goswami et al. |

FOREIGN PATENT DOCUMENTS

| EP | 2181898 | 5/2010 |
| JP | H0717428 A | 1/1995 |
| JP | 2006527359 A | 11/2006 |
| JP | 2008273504 A | 11/2008 |
| WO | 2010087022 A1 | 8/2010 |

OTHER PUBLICATIONS

International Search Report and Written Opinion for Application No. PCT/US2014/066096 dated Mar. 10, 2015 (8 pages).

VECTOR-BASED DRIVER ASSISTANCE FOR TOWING VEHICLE

RELATED APPLICATIONS

This application claims the benefit of U.S. Provisional Patent Application No. 61/905,677, filed on Nov. 18, 2013 and entitled "BACK-UP ASSISTANCE SYSTEMS AND METHODS," the entire contents of which are incorporated herein by reference.

BACKGROUND

When towing an object (e.g., another vehicle, a trailer, a bike rack, a cargo carrier, etc.—referred to herein as a "trailer"), it is usually desirable for the trailer to track the towing vehicle (e.g., follow the same path as the towing vehicle). It can, however, be difficult for a driver to detect when undesirable and dangerous a situation—such as, for example, a jack-knife condition—is occurring or starting to occur.

SUMMARY

Embodiments of the present invention relate to methods and systems for assisting a driver in performing various maneuvers with a vehicle towing a trailer. For example, various embodiments use vector-based monitoring techniques to detect adverse operating conditions while performing a back-up maneuver. In particular, some embodiments detect a jack-knife condition (i.e., when the towing/host vehicle and the trailer begin to form a V-shape) and provide a warning to the driver of the towing vehicle.

Some embodiments of the invention provide methods and systems for using towing vehicle and towed trailer vectors to inform a driver of relative movement between the vehicle and the trailer. The vectors are determined based on monitored information such as, for example, the towing vehicle's steering wheel angle, movement data (e.g., position, velocity, acceleration, yaw, etc.), and camera image data. The vectors are used to inform the driver when the towing vehicle and the trailer are traveling along the same curve, when the trailer is traveling straight, how to steer the towing vehicle to achieve a desired trailer trajectory, and when a jackknife condition is imminent. For example, the vectors can be used to assist the driver in performing back-up maneuvers.

In one embodiment, the invention provides a driver-assistance system for a host vehicle towing a trailer. The system includes a processor and a memory that stores instructions that are executed by the processor to provide system functionality. The system determines a velocity vector for the host vehicle at a location near a rear of the host vehicle at a defined lateral distance from a trailer hitch installed on the host vehicle. The system also determines a velocity vector for the trailer at a corresponding location on the trailer—that is a location on the front of the trailer at approximately the same defined lateral distance from the trailer hitch. The system compares the velocity vector for the host vehicle to the velocity vector for the trailer and determines, based on the comparison, whether a jack-knife condition is likely to occur. If a jack-knife condition is likely to occur, the system generates a warning signal.

In another embodiment, the invention provides a method of monitoring a trailer. A velocity vector for the host vehicle is determined at a location near a rear of the host vehicle at a defined lateral distance from a trailer hitch installed on the host vehicle. A velocity vector for the trailer is also determined at a corresponding location on the trailer—that is a location on the front of the trailer at approximately the same defined lateral distance from the trailer hitch. The velocity vector for the host vehicle is compared to the velocity vector for the trailer and, based on the comparison, a potential jack-knife condition is detected. When the potential jack-knife condition is detected, a warning signal is generated.

In yet another embodiment, the invention provides another method for monitoring a trailer. A velocity vector for the host vehicle at a location near a rear of the host vehicle at a defined lateral distance from a trailer hitch installed on the host vehicle is determined. A hitch vector for the host vehicle at a location of the trailer hitch is also determined. Due to the mechanical coupling between the host vehicle and the trailer at the trailer hitch, a hitch vector for the trailer is substantially similar to the hitch vector for the host vehicle and can be determined based on the hitch vector for the host vehicle. A trailer angle of the trailer is determined based on image data captured by a rear-facing camera positioned on the host vehicle and a velocity vector is determined for the trailer at a location near a front of the trailer at the defined lateral distance from the trailer hitch. The velocity vector for the trailer is determined based at least in part on the hitch vector for the trailer and the determined trailer angle. The velocity vector for the host vehicle is compared to the velocity vector for the trailer and an output signal is generated indicative of movement of the trailer relative to the host vehicle based on the comparison.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted, to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components: may be utilized to implement the invention. It should also be noted that a plurality of hardware and software based devices, as well as a plurality of different structural components may be used to implement the invention. In :addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that in at least one embodiment, the electronic based aspects of the invention may be implemented in software (e.g., stored on non-transitory computer-readable medium) executable by one or more processors . . . . As such, it should be noted that a plurality of hardware and software based devices, as well as a plurality of different structural components may be utilized to implement the invention. For example, "control units" and "controllers" described in the specification can include standard processing components, such as one or more processors, one or more memory modules including non-transitory computer-readable medium, one or more input/output interfaces, and various connections (e.g., a system bus) connecting the components.

Figure 1:
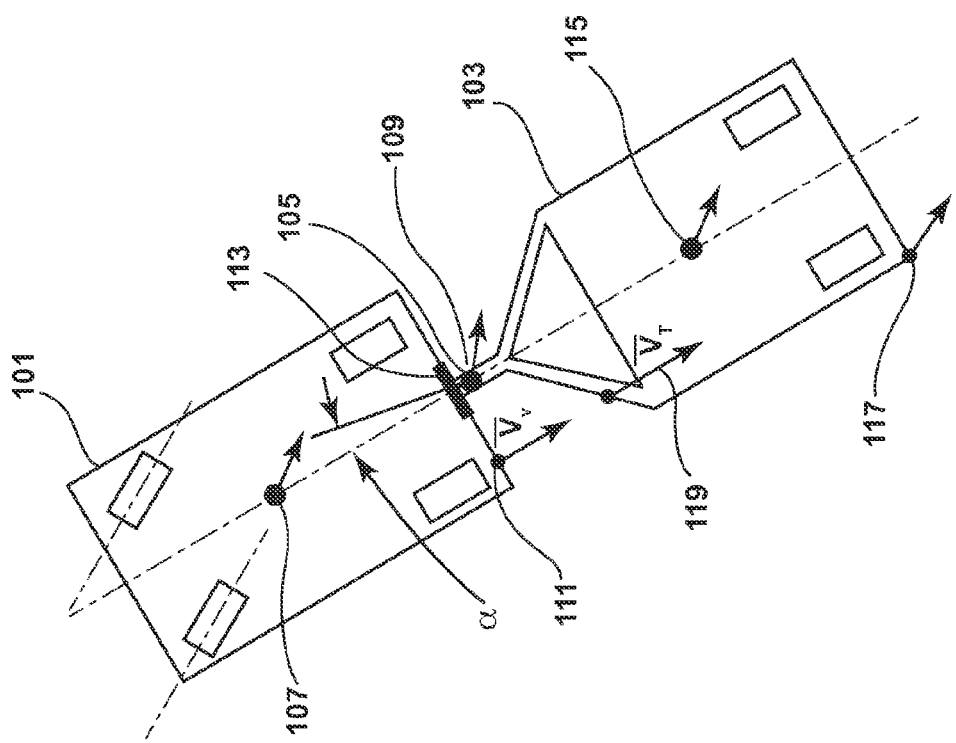
FIG. 1 is an overhead view of a towing vehicle and a trailer illustrating various vectors of the towing vehicle and the trailer.

The behavior of a moving object, such as a vehicle, can be defined by multiple vectors at various points on the object. FIG. 1 shows a towing vehicle 101 coupled to a trailer 103 at a trailer hitch 105 performing a maneuver in reverse. The behavior of the host vehicle 101 can be described in terms of a variety of vectors each positioned at (i.e., originating from or associated with) different points on the host vehicle 101. For example, as shown in FIG. 1, a first vector 107 positioned at (i.e., originating from) a center of the host vehicle 101, a second vector 109 positioned at the trailer hitch coupling, and a third vector 111 positioned at a location on the rear of the host vehicle 101 at a defined distance from the trailer hitch 105.

These vectors can be determined based on observed vehicle operating parameters such as, for example, acceleration information, velocity information, and steering angle information. This information can be determined by a sensor mounted on the vehicle or a camera 113 positioned to capture image data.

Furthermore, for a body of fixed dimensions moving in space, other vectors can be determined based on known vectors for two points on the object. Accordingly, if a system (such as described in further detail below) is configured to determine a first vector 107 and a second vector 109 based on measured/observed vehicle data, then the third vector 111 can be determined based on the first vector 107 and the second vector 109.

The host vehicle 101 of FIG. 1 is also equipped to determine various vectors that characterize the movement of the trailer 103. For example, because the host vehicle 101 is mechanically coupled to the trailer 103 at the hitch 105, the hitch vector 109 of the host vehicle is generally the same as the hitch vector of the trailer. Furthermore, the host vehicle 101 in the example of FIG. 1 is equipped with a rear-facing camera 113 configured to monitor the position and orientation of the trailer 103 relative to the host vehicle 101. Based on this information, the trailer angle ($\alpha$) of the trailer can be determined and another trailer vector 115 can be determined.

Again, because the trailer 103 is an object of fixed dimensions moving in a space, two vectors 109, 115 can be used to determine other vectors that characterize the movement of the trailer 103. For example, a second trailer vector 117 can be determined at the rear end of the trailer 103. This information may be useful because trailer sway is most prominent at the rear of the trailer. Furthermore, another vector 119 can be determined at a location on the front of the trailer.

As discussed further in the examples below, this trailer vector 119 is a velocity vector ($V_T$) positioned at a first defined linear distance from the trailer hitch 105. The trailer velocity vector $V_T$ corresponds to a host vehicle velocity vector ($V_V$) that is positioned at a corresponding location on the host vehicle. More specifically, the host vehicle velocity vector $V_V$ is positioned at the same linear distance from the trailer hitch 105 (i.e., vector 111).

Figure 2:
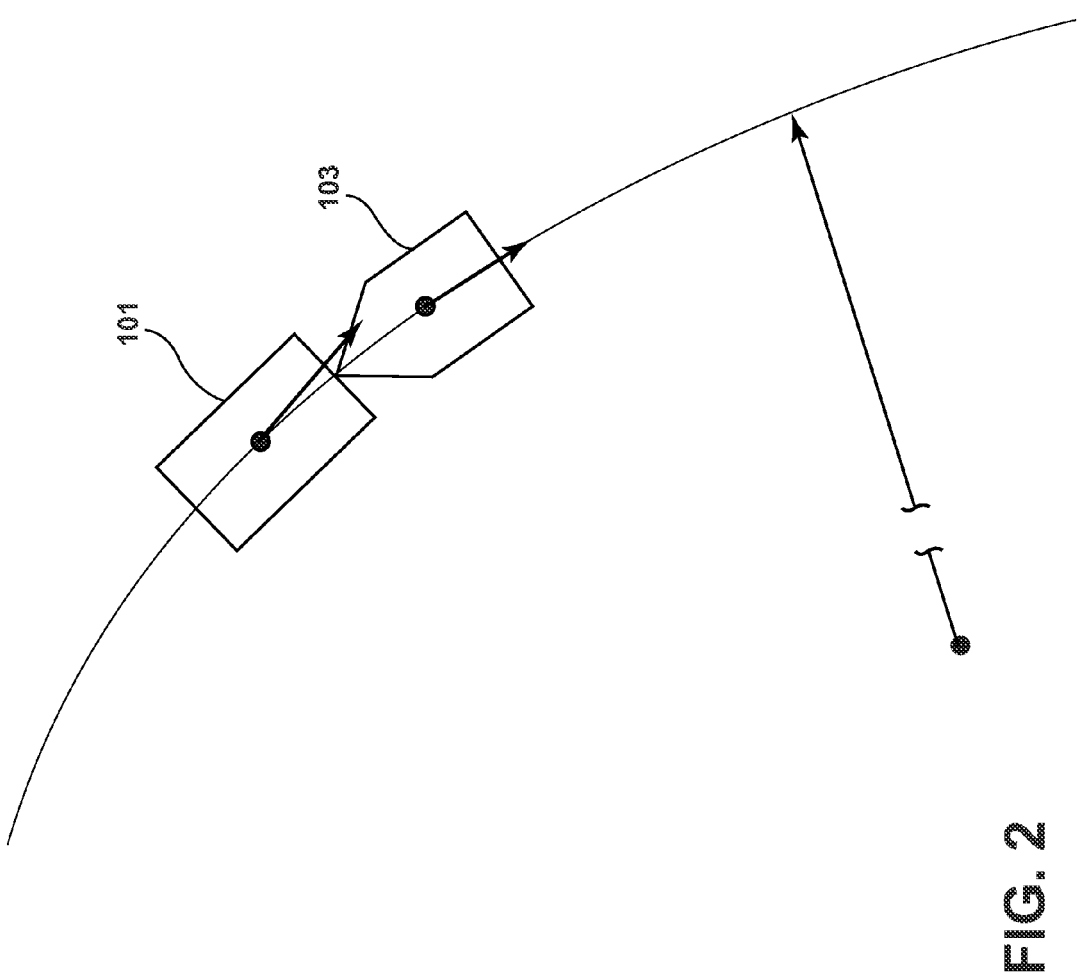
FIG. 2 is an overhead view of a towing vehicle and a trailer traveling along the same curve.

The systems and methods described below compare the trailer velocity vector $V_T$ to the host vehicle velocity vector $V_V$ to characterize movement of the trailer 103 relative to the host vehicle 101. For example, in the situation of FIG. 2, the host vehicle 101 and the trailer 103 are moving uniformly along a constant curve. As such, the host vehicle velocity vector $V_V$ and the trailer velocity vector $V_T$ are substantially the same (i.e., nearly identical). Furthermore, during continuous uniform movement, the difference between the host vehicle velocity vector $V_V$ and the trailer velocity vector $V_T$ remains constant. This identity between the two velocity vectors is also present when the vehicle and the trailer are moving in a straight line (either forward or in reverse).

However, when the host vehicle 101 is operating in reverse, the trailer 103 often does not follow the same path as the host vehicle 101. In some cases, this reverse movement results in a jack-knife scenario where the host vehicle 101 and the trailer 103 form a V-shape. Extreme cases of trailer jack-knife can cause damage to the trailer 103, the host vehicle 101, and the trailer hitch coupling 105. When a jack-knife scenario is occurring or is about to occur, the host vehicle velocity vector $V_V$ and the trailer velocity vector $V_T$ will no longer be the same nor will the difference remain constant. The systems and methods described herein monitor the difference between the host vehicle velocity vector $V_V$ and the trailer velocity vector $V_T$ to detect such jack-knife scenarios and to provide a warning to the driver of the vehicle before damage is caused.

Figure 3:
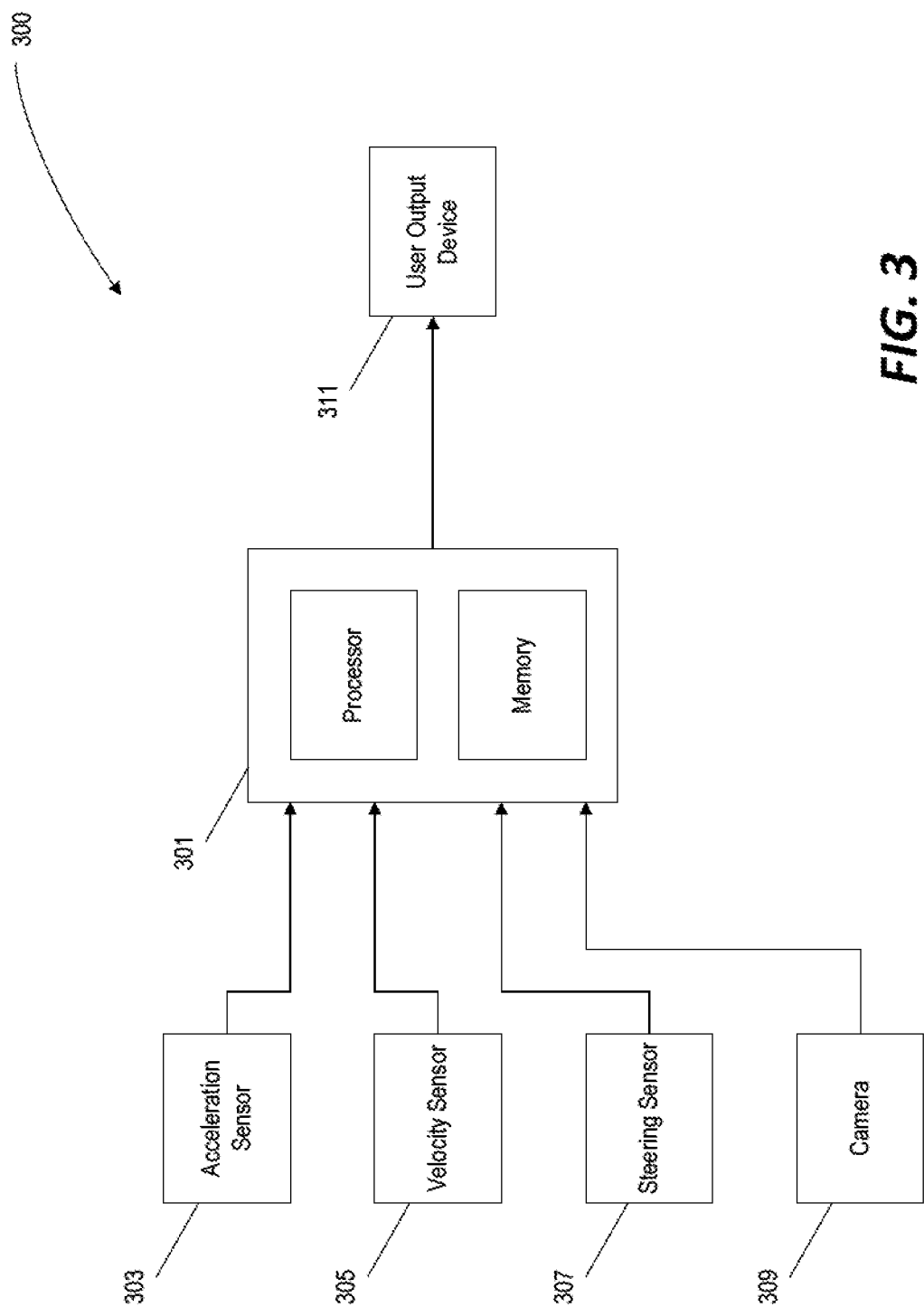
FIG. 3 is a schematic diagram of a driver assistance system according, to one embodiment.

FIG. 3 illustrates a system 300 for determine and monitoring various vectors of the host vehicle 101 and the trailer 103. A controller 301 includes a processor and a memory. The memory stores instructions that are executed by the processor to provide the functionality of the system 300 such as described herein. The controller 301 receives input data indicative of observed and measured vehicle parameters from various sensors including, for example, an acceleration sensor 303, a velocity sensor 305, and a camera 309. The controller 301 analyzes the input data, determines/monitors the relevant vectors, and provides an output signal to a user output device 311. In various constructions, this user output device 311 can include, for example, a speaker to provide an audible output, a visual display (LCD, LED, warning light, etc.) to provide a visual output, or a vibratory mechanism to provide haptic feedback.

The controller 301 includes one or more processing units (e.g., a processor, an application specific integrated circuit ("ASIC"), etc.), non-transitory computer-readable medium, and at least one input/output interface. The controller obtains vehicle operating parameters through an input/output interface. In some constructions, these external devices are connected to the input/output interface over a dedicated wired connection or communicate with the input/output interface over a controller-area-network communication bus (e.g., a CAN bus). In still other embodiments or more of these devices are embedded in the controller 301, itself.

Figure 4:
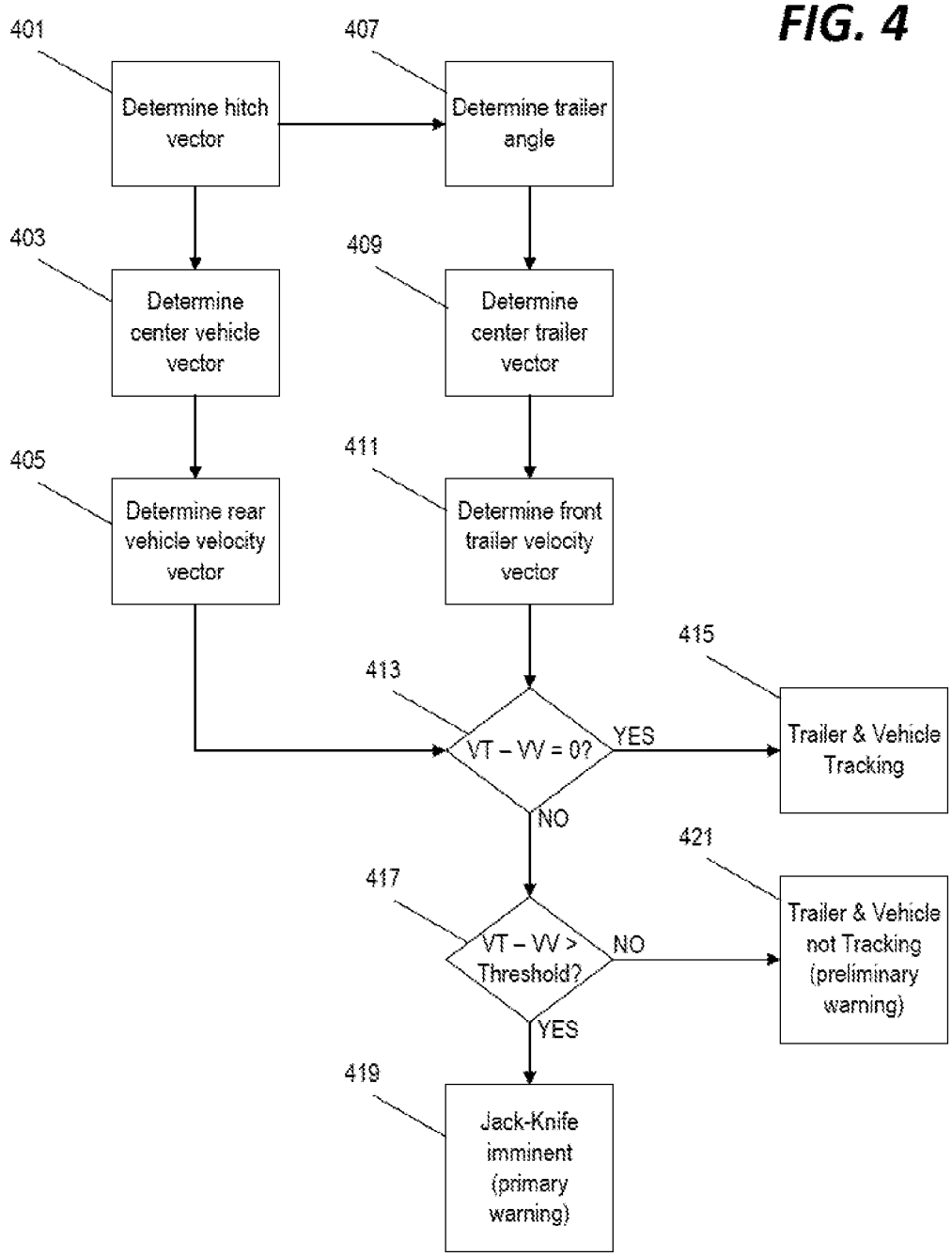
FIG. 4 is a flowchart of a method for monitoring a trailer implemented by the system of FIG. 3.

FIG. 4 illustrates a method implemented by the controller 301 to determine and monitor the various vectors associated with the host vehicle 101 and the trailer 103. The controller 301 calculates a vector 109 for the vehicle's hitch (step 401). The trailer hitch vector 109 can be determined directly based on measured sensor data or indirectly based on two other calculated vehicle vectors. The controller 301 also determines a center vehicle vector 107 based either on measured sensor data, or two other calculated vehicle vectors (step 403). Based on two previously calculated vehicle vectors (e.g., the center vehicle vector 107 and the hitch vector 109), the controller 301 determines the rear vehicle velocity vector $V_V$ (step 405).

The controller 301 also determines the trailer angle ($\alpha$) based on data from the rear-facing camera 113 (step 407) and determines a center trailer vector 115 based on the trailer angle ($\alpha$) (step 409). Using the center trailer vector 115 and the hitch vector 109, the controller 301 is able to determine the front trailer velocity vector $V_T$ (step 411).

The controller 301 compares the vehicle velocity vector (Vv) and the trailer yam vector (VT). If a difference between these vectors is approximately zero (or between zero and a predetermined minimum threshold) (step 413), the controller concludes that the trailer is tracking behind the towing vehicle (e.g., in a straight path or a curved path) (step 415). If the difference between the vectors is greater than a threshold (step 417), the controller 301 concludes that a jack-knife condition is either occurring or is imminent (step 419) and generates a warning, signal that is transmitted to the user output device 311. As discussed above, the user output device can be configured to provide a visual alert, an audible alert, a haptic alert, or a combination thereof.

Furthermore, in some constructions, the controller 301 generates a preliminary warning signal (step 421) when the host vehicle velocity vector $V_V$ is not the same as the trailer velocity vector $V_T$, but the difference does not yet exceed the threshold. In some such constructions, this determination is used to provide a continuous signal to the user output device 311 based on the detected relative movement between the vehicle and the trailer (or the lack thereof). For example, the controller 301 can use the difference to inform the driver when the towing vehicle and the trailer are traveling along the same curve, when the trailer is traveling straight, and when a jackknife condition is imminent.

It should be understood that, in some constructions, the controller 301 is configured to determine other vectors for other points of the vehicle 101 and the trailer 103 than those described above and illustrated in the method of FIG. 4. For example, in some constructions, the controller 301 determines at least one vector for a point along the rear of the trailer (vector 117 in FIG. 1). In a jackknife situation, the rear of the trailer may be the first to deviate from the vehicle's path. Therefore, the controller 301 can be configured to calculate a vector for the rear of the trailer and use this vector to identify imminent jackknife conditions.

The vectors calculated by the controller 301 can also be used to instruct a driver how to steer the towing vehicle to achieve a desired trailer trajectory. For example, the controller can be configured to output instructions for the driver (e.g., visual or audible instructions) that instruct the driver how to steer the vehicle (e.g., left or right or clockwise or counterclockwise) to change the trailer trajectory to a desired trajectory. In some situations, the desired trajectory can be a straight trajectory (with reference to the vehicle trajectory). In other situations, the desired trajectory may be a non-straight trajectory (with reference to the vehicle trajectory). For example, in some situations, the driver may be backing-up the vehicle and the trailer and may desire that the trailer follow a different path than the vehicle (e.g., to position the trailer in a parking space). The controller can be configured to automatically identify a likely position for the trailer when the vehicle is backed up (e.g., using image data and line recognition). Alternatively or in addition, the controller can be configured to allow the driver to manually specify a projected trajectory for the trailer (e.g., through a touchscreen, buttons, or other input mechanisms). For example, a driver can specify that he or she desires to back the trailer into a parking space located perpendicular to the vehicle on either the right or the left of the vehicle. After receiving the desired trajectory, the controller generates and outputs instructions to the driver. The instructions instruct the driver how to turn the steering wheel to move the trailer along the desired trajectory.

It should be understood that the controller can be configured to receive vehicle operating parameters from various devices including devices other than those described herein. Also, in some embodiments, the controller can be configured to receive operating parameters from the trailer through a wired or wireless connection (e.g., trailer velocity, steering angle, acceleration, yaw rate, etc.). It should also be understood that the functionality described above can be distributed among multiple controllers.

Thus, the invention provides, among other things, a system for determining and monitoring a variety of vectors indicative of movement characteristics of a host vehicle and a trailer and providing driver assistance information based on a comparison of at least one vehicle vector and at least one trailer vector. Various features and advantages of the invention are set forth in the following claims.

What is claimed is:

1. A driver-assistance system for a host vehicle towing a trailer, the system comprising:
   an acceleration sensor;
   a second vehicle sensor;
   a processor coupled to the acceleration sensor and the second vehicle sensor; and
   a memory coupled to the processor storing instructions that, when executed by the processor, cause the system to:
   determine a first vector for the host vehicle based on a signal from the acceleration sensor;
   determine a second vector for the host vehicle based on a signal from the second vehicle sensor;
   determine, based on the first vector for the host vehicle and the second vector for the host vehicle, a velocity vector for the host vehicle at a location near a rear of the host vehicle at a defined lateral distance from a trailer hitch installed on the host vehicle;
   determine a velocity vector for the trailer at a location near a front of the trailer at approximately the same defined lateral distance from the trailer hitch;
   compare the velocity vector for the host vehicle to the velocity vector of the trailer;
   determine, based on the comparison of the velocity vector of the host vehicle to the velocity vector of the trailer, whether a jackknife condition is likely to occur; and
   generate a warning signal when a jackknife condition is about to occur.

2. The driver-assistance system of claim 1, wherein wherein the instructions, when executed by the processor, cause the system to determine the first vector for the host vehicle by determining an acceleration vector for the host vehicle based at least in part on a signal from the acceleration sensor.

3. The driver-assistance system of claim 1, wherein the second vehicle sensor includes a steering angle sensor and wherein the instructions, when executed by the processor, cause the system to determine the second vector for the host vehicle by determining a steering vector for the host vehicle based at least in part on a signal from the steering angle sensor.

4. The driver-assistance system of claim 1, wherein the instructions, when executed by the processor, further cause the system to:
 determine a hitch vector for the host vehicle;
 determine a hitch vector for the trailer based on the hitch vector for the towing vehicle; and
 determine a second vector for the trailer,
 wherein the instructions, when executed by the processor, cause the system to determine the velocity vector for the trailer based on the hitch vector for the trailer and the second vector for the trailer.

5. The driver-assistance system of claim 4, further comprising a rear-facing camera positionable proximate to the rear of the host vehicle,
 wherein the instructions, when executed by the processor, further cause the system to:
  receive an image from the rear-facing camera, the image including the trailer, and
  determine, based on the received image, a trailer angle of the trailer relative to the host vehicle, and
 wherein the instructions, when executed by the processor, cause the system to determine the second vector for the trailer based on the determined trailer angle.

6. The driver-assistance system of claim 1, wherein the instructions, when executed by the processor, further cause the system to determine that the trailer is uniformly tracking the host vehicle when a difference between the velocity vector for the host vehicle and the velocity vector for the trailer remains substantially constant over a period of time.

7. The driver-assistance system of claim 1, wherein the instructions, when executed by the processor, further cause the system to determine that the vehicle and the trailer are moving straight when a difference between the velocity vector for the host vehicle and the velocity vector for the trailer is between zero and a predetermined minimum threshold.

8. The driver-assistance system of claim 1, further comprising a user output device, wherein the instructions, when executed by the processor, further cause the system to provide a signal to the user output device indicative of a difference between the velocity vector for the host vehicle and the velocity vector for the trailer.

9. The driver-assistance system of claim 8, wherein the user output device is configured to provide vehicle operating instructions to a driver of the host vehicle based on the signal indicative of the difference between the velocity vector for the host vehicle and the velocity vector for the trailer.

10. The driver-assistance system of claim 1, further comprising a user output device, wherein the instructions, when executed by the processor, cause the system to generate the warning signal when the jackknife condition is about to occur by transmitting a warning signal to the user output device.

11. The driver-assistance system of claim 10, wherein the user output device is configure to provide an output in response to receiving the warning signal, and wherein the output is at least one selected from a group consisting of a visual alert, an audible alert, and a haptic alert.

12. A method of monitoring a trailer, the method comprising:
 determining, with a processor, a first vector for a host vehicle based on a signal received from an acceleration sensor coupled to the processor;
 determining, with the processor, a second vector for the host vehicle based on a signal received from a second vehicle sensor coupled to the processor;
 determining, based on the first vector for the host vehicle and the second vector for the host vehicle, a velocity vector for the host vehicle at a location near a rear of the host vehicle at a defined lateral distance from a trailer hitch installed on the host vehicle;
 determining a velocity vector for the trailer at a location near a front of the trailer at approximately the same defined lateral distance from the trailer hitch;
 comparing the velocity vector for the host vehicle to the velocity vector of the trailer;
 determining, based on the comparison of the velocity vector of the host vehicle to the velocity vector of the trailer, whether a jackknife condition is likely to occur; and
 generating a warning signal when a jackknife condition is about to occur.

13. A method of monitoring a trailer, the method comprising:
 determining a velocity vector for a host vehicle at a location near a rear of the host vehicle at a defined lateral distance from a trailer hitch installed on the host vehicle;
 determining a hitch vector for the host vehicle at a location of the trailer hitch;
 determining a hitch vector for the trailer at the location of the trailer hitch based on the hitch vector for the host vehicle, the hitch vector for the trailer being substantially similar to the hitch vector for the vehicle due to a mechanical coupling between the host vehicle and the trailer at the location of the trailer hitch;
 determining a trailer angle of the trailer based on image data captured by a rear-facing camera positioned on the host vehicle;
 determining a velocity vector for the trailer at a location near a front of the trailer at the defined lateral distance from the trailer hitch, wherein the velocity vector for the trailer is determined based at least in part on the hitch vector for the trailer and the determined trailer angle;
 comparing the velocity vector for the host vehicle to the velocity vector for the trailer; and
 generating an output signal indicative of movement of the trailer relative to the host vehicle based on the comparison.

* * * * *